United States Patent [19]

Gallagher

[11] 3,895,102

[45] July 15, 1975

[54] SOLID FUEL FOR THE GENERATION OF HYDROGEN AND METHOD OF PREPARING SAME

[75] Inventor: John P. Gallagher, Wilmington, Mass.

[73] Assignee: Delta F Corporation, Woburn, Mass.

[22] Filed: Sept. 10, 1973

[21] Appl. No.: 396,087

Related U.S. Application Data

[63] Continuation of Ser. No. 192,948, Oct. 27, 1971, abandoned.

[52] U.S. Cl. ............... 423/657; 136/86 C; 252/188
[51] Int. Cl. ........................ C01b 1/03; C09k 3/00
[58] Field of Search .......... 136/86 C; 423/657, 192, 423/948; 252/188

[56] References Cited

UNITED STATES PATENTS

| | | | |
|---|---|---|---|
| 909,536 | 1/1909 | Brendley | 423/657 X |
| 2,533,937 | 12/1950 | Hybinette et al. | 423/657 |
| 2,623,812 | 12/1952 | Eborall et al. | 423/657 X |
| 2,676,153 | 4/1954 | MacMahon | 252/188.3 X |
| 3,540,485 | 11/1970 | Kummins | 136/86 C |
| 3,669,751 | 6/1972 | Richman | 136/86 C |

FOREIGN PATENTS OR APPLICATIONS

| | | |
|---|---|---|
| 126,872 | 7/1959 | U.S.S.R. |
| 21,032 | 1909 | United Kingdom |

*Primary Examiner*—Allen B. Curtis
*Attorney, Agent, or Firm*—Richard L. Stevens

[57] ABSTRACT

A solid porous rigid fuel composition for the generation of hydrogen gas by the reaction of a liquid hydroxide solution with the solid fuel, the fuel composition comprising silicon-containing metal particles, such as ferrosilicon, and a powdered salt compound, such as an alkali metal halide like sodium chloride, the metal silicon particles bonded together into a rigid porous mass, and the salt compound present within the porous mass to inhibit the formation of slow dissolving silicate cement on the surface of the silicon metal particles on repeated reaction of the silicon particles with a liquid hydroxide solution.

13 Claims, 2 Drawing Figures

3,895,102

SOLID FUEL FOR THE GENERATION OF HYDROGEN AND METHOD OF PREPARING SAME

This is a continuation of application Ser. No. 192,948, filed Oct. 27, 1971 now abandoned.

BACKGROUND OF THE INVENTION

Hydrogen gas has been generated by the reaction of a solid reagent, such as a metal, with a liquid acid or base. In one process, silicon, in the form of a solid ferrosilicon, is reacted with a liquid hydroxide, such as sodium hydroxide. The reaction is typically carried out by reacting ferrosilicon, in powder or granulated form, with a sodium hydroxide solution at a temperature typically ranging from about 60° to 100°C. The reactions involved in this form of generating hydrogen gas are as follows:

1. $2\ NaOH + Si^* + H_2O \rightarrow Na_2SiO_3 + 2H_2$
2. $Si^* + 2H_2O \rightarrow SiO_2 + 2H_2$
3. $Na_2SiO_3 + H_2O \rightarrow 2NaOH + SiO_2$ \* Silicon present in the form of ferrosilicon metal (75-99% weight silicon)

U.S. Pat. No. 1,037,919 discloses reacting granulated ferrosilicon with sodium hydroxide to generate hydrogen gas. In addition, it is also known that the reaction may be accelerated by employing aluminum (see Chemical Abstract), 56:3114E and U.S.S.R. Pat. No. 126,872 (1960)).

A number of fuel cells are known containing a hydrogen gas electrode, such as a hydrogen gas-air fuel cell. Such fuel cells require a constant supply of hydrogen gas of high purity during operation. A generator which is designed to provide hydrogen gas to a hydrogen gas electrode in a fuel cell must have a sensitive response to the fluctuating fuel demand of the hydrogen gas electrode. Such a hydrogen gas generator should, at the same time, be inexpensive and simple to manufacture and to operate. Hydrogen gas may be generated through the above reactions in a Kipp generator, and the hydrogen so generated provided to the hydrogen gas electrode of a fuel cell. A Kipp generator provides for the generation of hydrogen from the reaction of the solid ferrosilicon in one compartment, and the liquid reagent, such as sodium hydroxide, in another compartment. In a typical Kipp generator design, the liquid phase periodically contacts and moves away from the solid reagent. The liquid phase moves away from the solid reagent as the hydrogen gas is produced and the pressure increased; that is, as the liquid reagent wets the solid reagent, the reaction proceeds. The hydrogen gas, under pressure, then forces back the liquid reagent so that the solid reagent is wetted periodically due to this movement of the liquid phase, and often dried by the exothermic generation of heat by the reaction or air dried during the rewetting periods.

The employment of a Kipp hydrogen generator to supply hydrogen gas to an electrode is not wholly satisfactory in providing a controlled sensitive response to the generation of hydrogen gas. One difficulty associated with this generator and employing a solid ferrosilicon fuel and sodium hydroxide is that the reaction and generation of hydrogen gas, although vigorous at first, steadily diminishes so that hydrogen is produced progressively at a slower rate. The early vigorous reaction of the generation of hydrogen at the early stages of the reaction is often wasteful of hydrogen gas where the demand for the hydrogen gas by the fuel cell electrode may be, at that time, low or fluctuating, while in later stages of the reaction, the fuel cell electrode starves for hydrogen gas. Also the Kipp generator operation and design is such that it is often difficult to incorporate additional amounts of the solid ferrosilicon in order to provide a constant reaction rate. Thus, the generator design and the variation in reaction rate has, in the past, prevented the employment of the design and the reaction to be utilized in fuel cell technology.

Where aluminum metal alone is employed as the solid reagent to react with the hydroxide, aluminum hydroxide is left as a residue. This aluminum hydroxide forms as a very hard cake which clogs the reactor, particularly any screen pores surrounding the solid aluminum reagent. Further, the hard cake of aluminum hydroxide is extremely difficult to remove. The employment of as little as 10 percent by weight aluminum in combination with the ferrosilicon, although it enhances the reaction rate initially, fails to provide a constant reaction rate, while further, the aluminum hydroxide by-product creates a clogging problem on the screen retaining pores, thereby inhibiting the further rewetting of the aluminum or ferrosilicon metal with the hydroxide solution.

SUMMARY OF THE INVENTION

My invention concerns a new and improved solid fuel for the generation of hydrogen gas, a method of preparing and using such fuel, and to a fuel cell apparatus which includes a Kipp hydrogen generator employing my solid fuel. In particular, my invention relates to a solid fuel composition which contains an admixture of a salt compound with silicon-containing metal, such as ferrosilicon particles, the solid fuel so formed reactive with a liquid hydroxide to provide for the controlled generation of hydrogen gas, particularly for use in supplying hydrogen to a gas electrode of a fuel cell. My solid fuel composition provides for a more controlled and steady reaction rate, thereby overcoming many of the prior art difficulties associated with the prior use of ferrosilicon or other metals reactive with caustic for the generation of hydrogen, particularly in a Kipp generator or method.

Further, my invention is directed to a method of preparing a solid porous fuel, particularly a fuel which may be employed in a Kipp generator in a reaction with a liquid hydroxide, which method provides for the preparation of a solid fuel composition containing metal particles reactive with a caustic to produce hydrogen and which has a cement-like material which forms on the surface of the metal which inhibits the reaction rate, such as ferrosilicon particles. My method provides for the use of a salt compound with the metal in the form of a preformed granulated porous rod, or in the particular form of wafers, both suitable for use in a hydrogen generator. Further, my method of forming ferrosilicon powders into a porous mass, such as a rod, overcomes the difficulties of the prior art, and, in particular, such preforming permits, in the use of such rods, the reaction to proceed for a longer period of time with a liquid hyroxide prior to the onset of an insufficient reaction rate. Further, my method of preforming permits the preparation of porous thin wafers of my solid fuel composition, the use of such wafers, prolonging the required reaction rate activities, and having other advantages as hereinafter set forth. Furthermore, I have discovered a fuel cell apparatus which includes a fuel cell having a hydrogen gas electrode and a Kipp generator to provide hydrogen gas. My invention permits the employment of a Kipp generator in combination with a fuel cell where such generator employs my solid fuel composition and method.

My solid fuel used for reacting with a liquid like hydroxide, such as sodium hydroxide, to generate hydrogen gas then comprises granulated or powdered metal particles like silicon-containing particles, particularly ferrosilicon particles, admixed with a salt compound, particularly an inorganic salt compound and more particular an alkali metal or other water-soluble salts, and preferably a sodium salt compound, such as sodium chloride, the metal particles bonded, such as cemented, together in a desired shape, particularly in the form of a porous sintered rod or wafer shape derived from such rod by a thin exterior coating of a cement-like byproduct, such as a silicate compound, on the granulated metal particles, the silicate compound derived from reaction between the silicon-containing fuel and the particular hydroxide employed to generate the hydrogen which would be sodium silicate where a sodium hydroxide is employed.

My invention also comprises a method of preparing a solid silicon-containing fuel, such as a ferrosilicon fuel, which method comprises admixing the solid silicon-containing particles, such as granulated or powdered ferrosilicon particles, typically 10X down mesh particles, with a solid salt compound, preferably an alkali metal salt, such as an alkali metal halide, such as salt, or other inorganic water-soluble compounds, forming the powdered admixture into a desired shape, such as a rod-like shape; and bonding the admixture together, such as by reacting the admixture with a hydroxide solution, such as, for example, an alkali or alkali metal hydroxide, particularly sodium or potassium hydroxide, for a brief period of time to provide a silicate cement to bond the particles together (typically less than one minute, more particularly between 30 to 60 seconds where a 10 to 30 percent sodium hydroxide solution is used at 50 to 60°C) to form a thin coating of a silicate compound derived from the reaction on the surface of the silicon particles; drying the wetted particles, typically the drying accelerated due to the exothermic heat of reaction, thereby cementing the granulated particles together in a desired shape and providing a porous mass suitable for use in a Kipp generator design. Additionally, my method also comprises the further step of either forming the solid fuel composition into wafer-like elements, or preparing such wafer-like elements from the porous solid fuel rod, such as by a cutting operation, thereby providing wafers which may be incrementally added as required to a hydrogen generator containing a liquid hydroxide solution to produce controlled amounts of hydrogen gas, overcoming some of the difficulties associated with the use of a porous rod-like solid fuel element.

Where a silicon-containing solid material is reacted with a hydroxide in the presence of a catalyst, such as iron, that is, the reaction of, say, sodium hydroxide with silicon as shown in the above reaction, an insoluble silicate, such as sodium silicate, is formed. In the presence of water, the silicate is hydrolyzed with a hydroxide and silicate dioxide. However, in the Kipp hydrogen generator design, the liquid phase periodically moves away from the solid metal phase. I have found that because the reaction is exothermic, any remaining liquid on the particle surfaces of the solid metal reagent is quickly consumed in the reaction or driven off by evaporation, or both. Accordingly, I have discovered that appreciable amounts of sodium silicate remain unhydrolyzed in the continued operation of a Kipp generator design, and after several wettings and rewettings of the ferrosilicon, the surface of the ferrosilicon particles employed, say, in granulated rod form, becomes coated with a silicate compound which has a slow rate of dissolution in the liquid hydroxide reactant. I have discovered that this silicate compound acts as a passivating cement, since the rate of dissolution of the silicate is quite slow, and, thus, is one cause of the hydrogen gas generation rate gradually diminishing below accepted levels in a Kipp generator design.

I have found that a particular method of forming the silicon-containing powder into sintered rods or wafers, or other porous bonded formed structure or mass avoids some of the difficulties associated with rapidly falling rate of hydrogen generation. I have discovered that forming the ferrosilicon powder into a porous mass; e.g., rods by first confining it in a preshaped container, such as a porous cylindrical container, and, thereafter, soaking the powder very briefly, typically less than one minute, in a liquid hydroxide solution; for example, in a 5 to 25 percent sodium hydroxide solution at 40° to 80°C; e.g., 60°C, provides certain significant and definite advantages in utilization of the ferrosilicon as a fuel. The preshaping of the ferrosilicon powder into a porous preshaped rod-like form has several advantages when the rod is employed in a Kipp generator. First, upon repeating wettings, the rod has significantly less tendency to be reshaped and to have the particles clog the reactor chamber. Although the cementing action of the silicate still occurs, my preshaping method allows the reaction rate to proceed at a satisfactory level for a longer period of time before an insufficient rate of hydrogen genration results. In addition, the preparation of a preformed porous sintered rod of ferrosilicon has the advantages that the rod may then be sliced into wafer-like sections; for example, as thin as 0.1 inch, and the wafers subsequently employed as desired to generate hydrogen. The employment of wafers eliminates the wicking action of a porous rod with the hydroxide solution. Elimination of a wicking action first in less surging of hydrogen gas when the liquid hydroxide first contacts the ferrosilicon so that the reaction has a better response to the hydrogen gas demands. Secondly, I have found that the employment of wafers reduces the amount of powdered metal that is wetted each time the liquid contacts the metal, which has the effect of prolonging the required reaction rate activity of metals in that less metal is wetted during each contacting time period. Although my above method and the rods so prepared are quite beneficial for extending the reaction life of the ferrosilicon at the required hydrogen rate generation, this approach is also not wholly satisfactory. When longer reaction periods are desired, the repeated wettings and dryings continue to leave an appreciable percentage of fuel passivated by the formation of the silicate cement.

I have found that the reaction rate of metal particles; e.g., a silicon-containing porous solid reagent like a ferrosilicon, with a reagent to produce hydrogen may be further significantly extended and controlled by admixing with the ferrosilicon, prior to its formation into the desired porous shape, a compound which inhibits or retards the rate of the formation of the hard slow dissolving cements derived from the silicon-hydroxide reaction, or which permits the cement to be more soluble in the liquid solution or which increases the rate of dissolution of the cement, thereby retarding the build-up of the coating on the particles, or making the cement more porous, all of which permit a longer reaction time. It have found that certain compounds reduce the cohesiveness of the silicate reaction product so that on constant rewetting of the ferrosilicon particles in the presence of such interfering or retarding compounds reduces the silicate cementing and passivity of the reaction. The mechanism by which my compounds interfer or otherwise inhibit the slow dissolving of the silicate cement is not fully understood or known. However, not wishing to be bound by any particular theory of operation, it is believed that, for example, when common table salt is admixed with a metal silicon-containing powder capable of reacting with a liquid hydroxide, that although the cement continues to form on each rewetting as in previous practice, its dissolution is more rapid upon contacting the liquid hydroxide on the wetting. Thus, in effect, the admixture of my compounds might have the effect of altering the cement structure in a manner making it less cohesive and less able to resist the intermittent wetting and penetration of the liquid hydroxide, thus inhibiting the cement passification rection so that my sintered ferrosilicon rods and wafers may be employed and wetted repeatedly in a Kipp-type generator without a dramatic reduction in reaction rate or generation rate in hydrogen gas as previously experienced.

The admixture of such compounds with a silicon-containing powder and forming the admixture into a porous bonded mass, and employing the mass with a liquid caustic is most surprising and beneficial, particularly when a controlled fuel reaction rate and generation of hydrogen is required as in a fuel cell. For example, I have found that by wetting the ferrosilicon with a liquid hydroxide solution containing the salt compound does not give the desired results stated above, and, in fact, such addition tends to reduce the activity of the reaction. Thus, the salt compound selected should be admixed with the metal powder prior to its formation into the desired shape in order to obtain the full benefits of my invention.

My porous mass tolerates small amounts of large or fine particle sizes or mixtures thereof, but either size, particularly in large amounts, is not beneficial. A number and a variety of compounds may be usefully employed to be admixed with the silicon-containing metal powder to provide the benefits of the invention. Typical salt compounds useful in the practice of my invention would include, but not be limited to: the alkali metals; e.g., sodium, potassium, lithium, ammonium, and the alkaline earth metal; e.g., calcium, barium, magnesium, and other water-soluble metal; e.g., zinc, tin, copper, cadmium, manganese, bismuth, and other water-soluble salts; i.e., those having a greater water solubility than the silicate cement, or a greater rate of dissolution in the hydroxide solution used. The anions of such salts may include, but are not limited to: halides like chlorides, bromides, iodides, fluorides, as well as nitrates, phosphates, carbonates, borates, chlorates, sulfates, sulfites, hydroxides, oxides, acetates, tactrates, citrates, oxalates, and the like. The preferred compounds are those solid water-soluble inorganic salts which are low cost and readily available at high purity, such as the alkali metal halides and borates. More particularly, I have found that common table salt, potassium chloride, sodium and potassium tetraborates, sodium bromides and similar compounds are the useful compounds to obtain the benefits of my invention.

In the preparation of a porous mass, such as a rod, the preferred technique is to admix up to 50 percent, such as 40 percent, for example, of the salt compound with the granulated ferrosilicon, preferably, say of 10 to 20 mesh down; e.g., average or bulk particle size, for example, 20 to 150 mesh, and to place the composition in a porous cylindrical container and then wet very briefly the admixture in a liquid caustic to bond the ferrosilicon particles into a rod or to its desired form by the formation of a thin coating of a silicate cement. The amount of the salt compound to be employed may vary, as desired; however, I have found that amounts generally ranging from 10 to 30 percent by weight may be generally satisfactory for the purposes of producing a solid fuel of my invention. Large amounts of salt compound are not generally desirable due to practical weight, strength and solubility limitations. The chemical-bonding operation is typically carried out at a temperature of, say, 30° to 90°C, and more particularly, 50° to 60°C, with the exothermic heat of the reaction often sufficient to permit dryness. Although my chemical-bonding technique is desired, it is also recognized that my admixture may be bonded into various forms and shapes as desired to produce a porous ferrosilicon-salt structure, such as, for example, using common sintering technique, such as the use of pressure, heat or the like or a combination thereof, or adhesive compositions, such as resins. Typically, the porous mass should be formed of such a structure as to withhold the salt within the mass; that is, unnecessarily large silicon particles and pores might permit the beneficial effect of the salt compound to be lost. The particle size of the ferrosilicon and the salt should generally be of the same or compatible size. Also, if desired, the granulated or powdered ferrosilicon may be pretreated with pretreating agents, such as the salt compound, prior to the bonding operation, such as by reagents to change the nature and extent of the surface, or other physical or chemical characteristics of the particles prior to bonding or use, such as to inhibit the adhesion of the silicate cement to the surface of the particles, or to change the reactivity of the metal.

It is most desirable to maintain the required solid fuel activity throughout the entire reaction at a relatively constant rate. It is also recognized that to minimize the amount of the hydroxide used for the reaction, it is necessary to offset the fact that the hydroxide is being consumed during the reaction. Of course, the hydroxide is regenerated by the subsequent hydrolysis of the silicate; however, this reaction does not go fully to completion as a practical matter, and typically is required in a 7:10 ratio with the silicon metal employed. However, I have found that even at this ratio, the reaction rate near the end of the reaction is considerably reduced. This reduction in reaction at the end also has an adverse effect on the overall useful fuel efficiency, since in this case, the hydrogen gas, even though it is continued to be generated, the rate is typically below a typical hydrogen electrode fuel cell demand. I have also found that with my salt compound present in the porous solid ferrosilicon fuel, that by the end of the reaction, an increased amount of salt is contained in the reacting liquid solution. The presence of the salt compound, such as sodium chloride, tends to slow the reaction as the salt concentrate increases. However, the reaction rate does continue at a considerably and significantly better rate than when the salt compound is not employed, and, more importantly, goes to completion. However, often greater activity is desired, particularly at the end of the reaction cycle.

I have further discovered that greater activity at the end of the reaction may be accomplished by employing small amounts of aluminum, either as a powder admixed into the porous mass, or in the silicon metal as an alloying ingredient. For example, I have found that generally less than about 3 percent by weight, and typically, 0.5 to 2 percent by weight, admixed with the powdered metal or in the ferrosilicon and the salt compound is desirable. As is known, aluminum reacts vigorously with the hydroxide solution employed according to the following reactions:

$2Al + 2NaOH + 2H_2O \rightarrow 2NaAlO_2 + 3H_2$
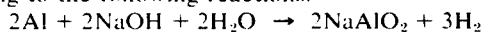
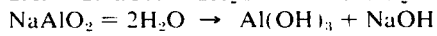
$NaAlO_2 + 2H_2O \rightarrow Al(OH)_3 + NaOH$ I have also found that when 10% or more aluminum powder is employed, together with ferrosilicon, although the initial reaction is enhanced, the cementing action of the silicate, together with the formation of the aluminum hydroxide reaction product, considerably adds to a clogging problem in the reactor, and, in particular, the aluminum hydroxide blocks the pores of any screen surrounding the solid fuel as it is immersed in the liquid hydroxide solution.

I have discovered that smaller amounts of aluminum; that is, about 3 percent or less, in combination with the presence of a salt compound, as previously described, in a sintered rod or wafers, results in an excellent sustaining reaction rate, while in addition, the products of the reaction; that is, the aluminum hydroxide and the salt, remain in either a dissolved or suspended state, and fail to clog the reactive screen pores as when larger amounts of aluminum are employed. Thus, my invention also comprises the concept of employing small amounts of aluminum in admixture with or as part of the ferrosilicon and the salt compound in forming rods and wafers in order to provide an enhanced reaction, particularly at the end of the reaction.

I have also found in combination with my techniques as described above that somewhat increased activity of the ferrosilicon salt or ferrosilicon-salt-aluminum mix in the rod therein may be improved by increasing the surface to volume ratio of the preformed fuel slug or wafer. For example, I have noted that increased reactivity within certain limits is possible by employing a smaller particle-size ferrosilicon. Furthermore, in another embodiment of my invention, I have found that the aluminum content in the rods, particularly in wafer form, may be varied so as to provide for an essentially constant reaction rate; that is, for example, when the fuel is used in wafers, the aluminum percentage in the first several wafers to be employed in the Kipp generator may be zero or quite low; that is, 0.1 to 0.5, while the aluminum content can be progressively increased in other wafers from, for example, 0.5 to 1.0 percent, the intermediate wafers at 1.0 to 1.5 or 1.5 to 2.0 or 2.0 to 2.5 for later reacting wafers. In this manner, the amount of aluminum and the difficulties associated with aluminum may be minimized while the function of the aluminum in accelerating the reaction rate at the end of the reaction may be employed.

It is most desirable in the operation of a Kipp hydrogen generator that the products of the reaction in the liquid solution can be simply drained in the solution from the reactor without any handling by the operator. It is also most important that such by-products be either in a wholly dissolved or suspended state rather than as a hard voluminous or bulky precipitate. In this regard, I have found that the silicon metal employed in combination with iron creates no significant problem; that is, the silicon by-products being sufficiently dissolved or suspended in the aqueous liquid at the end of the reaction. In addition, small amounts of aluminum are tolerated without serious deleterious effects. However, I have found that the presence of iron, or other metals similar to iron in nature which produce insoluble by-products, is not wholly satisfactory, since it does not engage in the reaction with the caustic, except on the surface to form a protective oxide. I have found that it is particularly satisfactory to employ a ferrosilicon material wherein the silicon percentage is at least 94 percent and preferably above 98%+ or higher. The silicon does not pose a problem as the iron in the ferrosilicon does when the solution is expelled from the generator. Therefore, contrary to the literature, I have found that very high silicon-content metals may be employed in my process, and have reasonably good reactivity with the hydroxide solution. The iron present in the silicon is believed to provide a catalyst to the reaction, and, of course, it is recognized as a part of my invention that any silicon-containing solid reagent material or metal or alloy may be employed, preferably in the presence of a catalyst, such as iron or other catalysts, in my invention.

In the reaction of a solid ferrosilicon material in a Kipp-like generator, I have found it very advantageous and unique to confine the wafers or ferrosilicon porous rod materials within a porous inert screen material, such as a stainless steel screen. The screen material normally surrounds the porous rod, preventing the falling off of large chunks of the rod into the liquid reagent, and, thereby, causing uncontrolled generation of hydrogen gas. I have found that it is most advantageous and quite unexpected that if a fine mesh stainless steel screen of 320 mesh is employed as the container wall when employing either wafers or rod fuel of my invention, the screen provides a nonoxidizable ferrous-containing alloy which may assist considerably in providing a corrosion couple for the silicon. The screen also in this mesh size prevents the inclusion into the liquid reaction medium of large precipitate materials or particles which might tend not to be dissolved or suspended. Thus, my invention also contemplates using as a screen a 325 mesh or smaller mesh, the mesh made of a nonoxidizable material, such as a stainless steel or other corrosion-couple metal.

SPECIFIC EMBODIMENTS OF THE INVENTION

Figure 1:
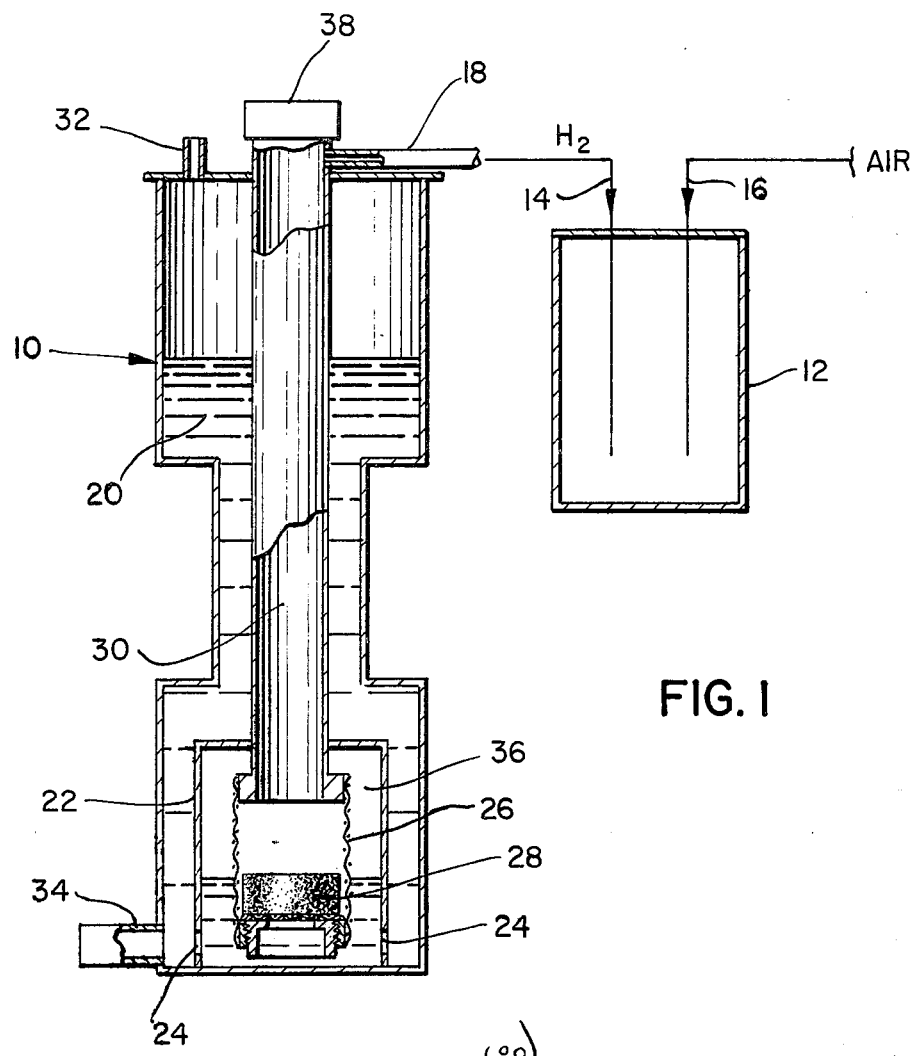
FIG. 1 is a schematic illustration of a Kipp generator employing my fuel supplying hydrogen gas to a fuel cell.

To illustrate the advantages of my invention, in particular the employment of salt compounds to inhibit the formulation of the silicate cement and to provide a solid fuel for the production of hydrogen gas, cemented porous ferrosilicon rods containing various salt compounds were prepared and the nature of the reaction of such rods with a liquid hydroxide observed.

A powdered fuel composition was prepared by blending in a mixture of 28 grams of a ferrosilicon powder of 40 to 60 mesh, the ferrosilicon containing approximately 98 percent by weight plus of silicon, together with 12 grams of a granulated or powdered salt compound as set forth. The blended admixture was then poured into a cylinder having a diameter of approximately 0.75 inches, the cylinder formed of perforated polypropylene which is lined with a 325 mesh stainless steel screen.

A dipping solution was then prepared by incorporating 33 grams of sodium hydroxide into 300 ccs of water, together with an amount of each salt compound as illustrated in the foregoing test, the salt compound in the amount of the saturation value at 60°C. Although the presence of a salt in the liquid caustic employed in the Kipp generator fails to achieve the benefits of my invention, and, in fact, slows the reaction, the purpose of employing a saturation value of salt in the dipping solution in preparing the porous cemented ferrosilicon rods is to prevent some of the salt compound from being lost during the dipping operation, although it is not essential that said salt compound be employed in the dipping operation. The dipping solution is then heated to 55° to 60°C and the powdered fuel composition in the cylinders are then dipped into the dipping solution for approximately one minute or less. The dipped rods are then allowed to air dry for about two hours and are removed from the polypropylene container. The rods then comprise a porous cylinder of granulated ferrosilicon particles and salts, the ferrosilicon particles cemented at its contacting points with a silicate cement coating through the dipping operations, the exterior surface of the rod surrounded by and bonded to a 325 mesh screen.

Rods are prepared as set forth above employing the following salt compounds:

$CaCl_2 \cdot 2H_2O$ $CuCl_2 \cdot 2H_2O$

DEXTROSE $MgSO_4 \cdot 1H_2O$

KCl $KNO_3$ $K_2MnO_4$ $KNaC_4H_4O_6 \cdot 4H_2O$

Na acetate $Na_2B_4O_7 \cdot 10H_2O$

NaBr $Na_2CO_3 \cdot 1H_2O$ $NaNO_3$ $Na_3PO_4 \cdot 12H_2O$ $Na_2SO_4$ $Na_2SO_3$ $AlCl_3 \cdot 6H_2O$ $NH_4Al(SO_4)_2 \cdot 12H_2O$ NaCl control no salt compound The rods so prepared were 4 inches by 0.75 inches in diameter and were then evaluated by visually observing the nature and extent of the reaction when the test samples were inserted into a liquid hydroxide solution. The procedure was to immerse the test sample rod approximately half-way into a 20 percent sodium hydroxide solution at a temperature of 80° to 85°C. A visual observation was made of the time required after wetting and rewetting for a vigorous reaction to occur. Based on such tests and observations, the following legend will describe the time period for such tests as carried out on the test samples:

LEGEND

F - FAST (0–30 seconds)

MF - MODERATE-FAST (30 seconds - 1 minute)

M - MODERATE (1–2 minutes)

MS - MODERATE-SLOW (2–4 minutes)

S - SLOW (4–6 minutes)

VS - VERY SLOW (6–10 minutes)

N - NIL, LITTLE OR NO REACTION AFTER 10 MINUTES

The test procedure was conducted with each test sample rod prepared with the rod allowed to dry prior to again dipping the rod and the dipping procedure continued with visual observations made after each dip. This procedure simulates the constant wetting, drying, rewetting and redrying of the rod as would occur in a Kipp-type generator for the generation of hydrogen gas.

Following the foregoing procedures, the following test results were observed:

TABLE

REACTIVITY OF TEST SAMPLES IN GENERATING HYDROGEN GAS

| SAMPLE NO. | 1st DIP | 2nd DIP | 3rd DIP | 4th DIP | 5th DIP | 6th DIP | 7th DIP | 8th DIP |
|---|---|---|---|---|---|---|---|---|
| 1 | F | MF | MF | M | MS | S | VS | VS |
| 2 | MF | M | M | S | VS | VS | VS | VS |
| 3 | S | S | VS | VS | N | — | — | — |
| 4 | MF | M | M | S | S | VS | VS | VS |
| 5 | MF | MF | MF | MF | MF | MF | M | M |
| 6 | F | F | MF | M | MS | S | S | VS |
| 7 | M | M | M | MS | MS | MS | S | S |
| 8 | MF | MF | M | MS | MS | MS | S | VS |
| 9 | MF | M | M | M | MS | MS | S | S |
| 10 | F | F | F | MF | MF | MF | MF | MF |
| 11 | MF | M | M | M | M | MS | MS | MS |
| 12 | MF | M | M | M | M | MS | S | VS |

TABLE—Continued

REACTIVITY OF TEST SAMPLES IN GENERATING HYDROGEN GAS

| SAMPLE NO. | 1st DIP | 2nd DIP | 3rd DIP | 4th DIP | 5th DIP | 6th DIP | 7th DIP | 8th DIP |
|---|---|---|---|---|---|---|---|---|
| 13 | MF | MF | MF | M  | MS | S  | VS | VS |
| 14 | F  | MF | M  | MS | MS | MS | S  | VS |
| 15 | MF | MF | M  | M  | MS | MS | S  | S  |
| 16 | MF | M  | M  | M  | MS | S  | S  | VS |
| 17 | MF | M  | MS | S  | S  | VS | VS | VS |
| 18 | MF | M  | M  | MS | S  | VS | VS | VS |
| 19 | F  | F  | MF | MF | MF | MF | MF | M  |
| 20 | F  | MF | S  | VS | N  |    |    |    |

FIG. 1 is a general schematic representative view of the combination of a Kipp generator employing my solid fuel and techniques in combination with a fuel cell illustrating such combination and the method of supplying a hydrogen gas fuel cell. The Kipp generator has an external body 10 and is adapted to supply a fuel cell 12 which contains a hydrogen gas electrode 14 and an air electrode 16 through a hydrogen gas outlet 18 in a Kipp generator. The Kipp generator contains a liquid hydroxide solution in a reservoir 20, the lower part of the solution under a hydrostatic liquid head pressure within a gas shroud element 22 having flow passages 24 therein for the admission of liquid hydroxide. A separate fuel chamber 30 is provided which contains a solid porous fuel rod or a wafer 28 as described in my invention, the wafer surrounded on its side and bottom by retaining screens comprising an internal screen of about 60 mesh and an external stainless steel screen of about 325 mesh (see 46 and 48 FIG. 1 and FIG. 2). The generator is provided with an inlet 32 for the introduction of liquid hydroxide solution, and a drain outlet 34. The fuel chamber has a gas-tight fuel inlet cap 38. Hydrogen gas 36 on reaction with the liquid hydroxide with the solid fuel wafer is generated above the liquid in the gas shroud element and passes through the fuel chamber 30 to the outlet 18.

Figure 2:
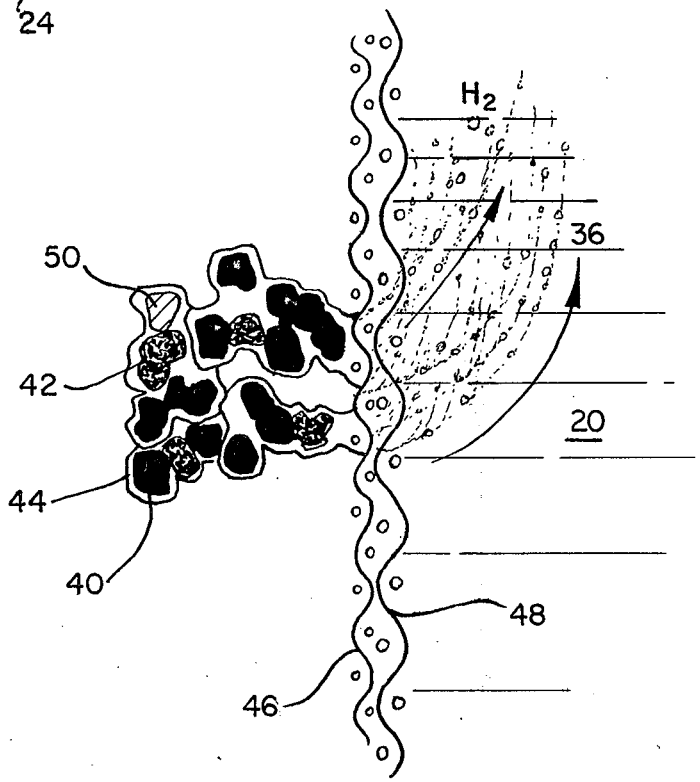
FIG. 2 is a partial schematic fragmentary enlarged cross-sectional view of my solid porous fuel employed in FIG. 1.

FIG. 2 is a schematic illustrative fragmentary stylized cross-sectional view in enlarged form of a portion of the solid fuel wafer 28 as employed in FIG. 1. FIG. 2 shows the ferrosilicon particles 40 bonded together into a rigid porous mass and containing therein a salt compound 42, such as sodium chloride, the ferrosilicate particles having a thin coating of a sodium silicate cement derived from the reaction of the liquid hydroxide with the ferrosilicon 44. The fuel wafer is contained within an interior stainless steel screen of 60 mesh 46 and an exterior stainless steel screen of 325 mesh. The fuel rod also contains metal aluminum particles 50.

In operation, the liquid hydroxide solution 20 in the reservoir is permitted to enter the gas shroud element 22 through flow passages 24 and to react with the solid porous fuel wafer 28 in the fuel chamber by passage through the top and bottom screen 26 into the pores of the wafer. As hydrogen gas 36 is generated to form the liquid level of sodium hydroxide solution in the gas shroud element 22, it passes upwardly through the fuel chamber 30 to the outlet 18 and hence to the hydrogen gas electrode 14 in the fuel cell 12 while air is supplied to the other electrode 16 from a source not shown. The generation of the hydrogen gas creates a pressure above the surface of liquid in the gas shroud element 22 which prevents the liquid hydroxide solution 20 from moving upwardly into the fuel chamber 30, the level changing as the hydrogen gas varies in pressure due to the extent of the reaction, thus resulting in a constant wetting, drying and rewetting of the solid fuel wafer 28 by the hydroxide solution 20.

FIG. 2 is generally a schematic illustration to illustrate the thin coating of the silicate cement formed on the reactive metal particles, and the particles and the thin coating are shown out of proportion as regards size and position.

Although my invention has been illustrated in particular concerning the problems and difficulties associated with the reaction of silicon-containing metal particles with liquid hydroxide, it is recognized and is a part of my invention that the concepts discovered and found by me may be employed with other metals and metal particles which react with a liquid reagent, such as a liquid hydroxide, whereby on such reaction, hydrogen gas or other gas is formed, and whereby a slow dissolving cement-like material is produced as the by-product, which cement-like material forms on the exterior surface of the solid metal particles and progressively reduces the rate or nature of the reaction. My concept, thus, involves broadly employing any compound, organic or inorganic, in the nature of my salt compounds which have a greater solubility in the particular liquid reactant or a greater rate of dissolution in such reactions than the cement-like material being formed, thereby providing for retarding the formation of the cement material, and increasing the time of the reaction. For example, another metal which involves the formation of a hard slow dissolving compound includes the reaction of aluminum and aluminum alloys with liquid hydroxide, whereby an aluminum oxide is formed which considerably and progressively reduces the reaction rate.

What I claim is:

1. A fuel composition of a dimensionally stable sintered porous mass capable of generating hydrogen gas by sequential contact with an aqueous hydroxide solution which consists essentially of:

silicon-containing metal particles;

a salt compound in an amount of from 5–50 percent by weight of the composition, the salt compound admixed with and bonded to the silicon-containing metal particles; and a silicate cement disposed on at least a portion of the silicon-containing metal particles, the silicate cement formed when the composition is wetted with the hydroxide solution the parts by weight of the salt compound sufficient to allow the silicate cement formed to dissolve at a greater rate upon subsequent rewettings with the hydroxide solution then if the salt compound had not been present.

2. The fuel cell composition of claim 1, wherein the metal particles are bonded together in a porous mass by a thin coating of a silicate cement material on the surface of the metal particles.

3. The composition of claim 1, wherein the salt compound is an alkali metal salt compound.

4. The composition of claim 1, wherein the composition includes not more than 3 percent by weight of aluminum bonded to the porous mass.

5. The composition of claim 1, wherein the salt compound is selected from the group consisting of sodium chloride, sodium borate, potassium chloride, potassium bromide, or combinations thereof.

6. The composition of claim 1, wherein the salt compound is present in the amount of from about 10–30 percent by weight.

7. A method of controlling the generation of hydrogen gas when a fuel comprising a sintered dimensionally integral porous mass of silicon-containing metal particles and not more than 50 percent by weight of a salt compound bonded to said metal particles is periodically wetted with an aqueous hydroxide solution, whereby a hard, slow-dissolving silicate compound forms on the surface of the silicon, which would inhibit the generation of hydrogen gas after such repeated contacts, which comprises:
  wetting the composition with the aqueous hydroxide solution;
  generating hydrogen and simultaneously forming a silicate cement which adheres to at least a portion of the surface of the silicon-containing metal particles;
  withdrawing the hydroxide solution from the composition;
  rewetting the composition with the hydroxide solution to generate hydrogen and to remove a portion of the slow-dissolving silicate compound formed when the hydroxide solution wets and is removed from the composition.

8. A method of preparing a solid porous fuel composition for reaction with liquid hydroxide to generate hydrogen gas, which method comprises:
  a. admixing silicon-containing metal particles and a powdered water-soluble inorganic salt compound, said compound selected to alter the formation of silicate cement on the surface of the metal particles on reaction of the aqueous hydroxide solution, the salt compound present in said admixture in an amount up to 50 percent by weight, the metal particles and powdered salt compound having an average particle size of between about 10–325 mesh;
  b. forming the admixture so prepared into a desired form; and
  c. dipping the formed admixture into a liquid hydroxide solution for a period of time sufficient to provide for the bonding in place of all particles at their contacting points, a silicate cement material formed on at least a portion of the silicon-containing metal particles, thereby providing a porous, rigid mass of all particles.

9. The method of claim 8, which includes admixing the metal particles and powdered salt compound not more than 3 percent by weight of aluminum particles.

10. The method of claim 8, wherein the salt compound is selected from the group consisting of sodium chloride, potassium chloride, potassium bromide, or sodium tetraborate.

11. The method of claim 8, wherein the weight of the ferrosilicon particles have from about 75–99+ percent by weight of silicon.

12. The method of claim 8, which includes dipping the formed admixture into a hydroxide solution at a temperature of between about 40°–80°C for a period of about 1 minute or less.

13. The method of claim 8, which comprises:
  adding the admixture to a porous non-reactive cylindrical tube;
  dipping the cylindrical tube containing the admixture into the liquid hydroxide solution;
  removing the tube from the liquid hydroxide solution; bonding of the ferrosilicon particles together;
  drying the porous bonded mass of ferrosilicon particles; and
  recovering a porous rigid rod of bonded particles from the cylindrical tube.

* * * * *